Patented May 22, 1945

2,376,672

UNITED STATES PATENT OFFICE 2,376,672

POULTRY LITTER

Luella P. Dreyling, South River, N. J.

No Drawing. Application November 27, 1943, Serial No. 512,067

16 Claims. (Cl. 119—1)

This invention relates to mineral poultry litters and more particularly to mineral poultry litters which have disinfecting properties.

The primary functions of a poultry litter are (1) to promote activity in fowls especially where they are confined to relatively small areas, (2) to provide insulation against cold, (3) to absorb shock when landing in flying from perches and (4) to encase excrement, thereby maintaining proper sanitation on poultry house floors.

Conventional litters are composed of straw, wood shavings, dry peat moss, corn cob pulp, sugar cane pulp and like organic materials. Some types are sterilized but retain their sterile properties for only short periods due to decomposition of the organic litter as caused by contact with and absorption of moist excrement. Poultry diseases such as coryza, fowl pox, brooder pneumonia, moniliasa, pullorum, coccidiosis and parasites such as round worms, mites and lice are harbored and thrive in damp litters. It is fundamental that dry living conditions are essential to the good health and growth of poultry raised in confinement. Thus, in spite of the fact that the organic litters heretofore available absorbed and retained moisture, they have been widely used by poultry raisers who realize that some means must be provided to promote activity or else cannibalism (the tendency for fowls to pull out feathers, pick the toes, eat eggs, etc.) may occur in the flocks. Contrary to the previously accepted principle of absorption of moisture in the litter, and consequent retardation of evaporation of the moisture, I have devised an improved litter which expedites moisture evaporation and at the same time disinfects, both properties contributing to the general health and growth of the poultry.

This invention has as a primary object the provision of an improved poultry litter which provides dry and sanitary living conditions, thus substantially eliminating the common fowl diseases and greatly reducing mortality rate. Another object is the provision of a poultry litter which absorbs shock when a fowl alights on flying from a perch. Another object is the provision of a litter which maintains disinfectant properties for extended periods of time. Another object is the provision of a poultry litter which promotes activity, thereby discouraging cannibalism. Another object is the provision of a puoltry litter which insulates against cold. Another object is the provision of a disinfectant type litter which is so physically constructed that the poultry does not pick up and eat that portion of the litter containing the disinfectant. A further object is the provision of a litter which prevents mold growth. A still further object of the invention is the provision of a process for preparing poultry litters which is simple and economical. Other objects will appear as the description of the invention proceeds.

These objects are accomplished in accordance with the present invention by means of an improved litter comprising a plurality of components of different particle size, the major component consisting of mineral aggregates and the component of smaller particle size consisting of mineral or organic material carrying a slowly volatile disinfectant. In the preferred embodiment of the invention, the litter comprises mineral aggregates of relatively large and rounded particles in major proportion and uniformly distributed therewith a smaller amount of a finely divided mineral or organic component carrying a slowly volatile disinfectant selected from the class consisting of monohydric and dihydric phenols and homologs and substitution products thereof.

The following examples are given by way of illustration only and no limitations are intended thereby except as indicated in the appended claims.

Example 1

| | Percent by weight |
|---|---|
| Sea sand silica (rounded particle 2.5–40 mesh) | 86.3 |
| Ortho phenyl phenol | 1.2 |
| Infusorial earth (45–140 mesh) | 12.5 |
| | 100.0 |

In preparing the composition, the ortho phenyl phenol was dissolved in toluol in a concentration of 20% and added to the infusorial earth and mixed thoroughly until the toluol was evaporated leaving the disinfectant uniformly deposited on the particles of the infusorial earth. The treated finely divided particles of infusorial earth were then uniformly distributed throughout the sea sand by further mixing.

The treatment of the finely divided portion of the litter composition rather than the larger sea sand particles has a definite and important purpose, since poultry has a tendency to pick up and eat a certain amount of grit to aid digestion, and the specific method employed in the present invention prevents the poultry from taking in some of the disinfectant in this manner by treating the small dust-like particles which the poultry cannot pick up instead of the larger rounded sea sand particles which form the major portion of litter composition.

Example 2

| | Per cent by weight |
|---|---|
| Gypsum sand (rounded particles 2.5-40 mesh) | 82.2 |
| Wood flour (45-140 mesh) | 17.0 |
| Ortho chloro-phenol | 0.8 |
| | 100.0 |

This litter was prepared in accordance with the procedure of Example 1, the disinfectant being applied to the wood flour from solution in toluol and after evaporation of the toluol the treated wood flour was mixed with the gypsum sand. The disinfectant properties of this litter was retained for more than one month in actual use in a poultry house.

Example 3

| | Per cent by weight |
|---|---|
| Silica sand (rounded particles 2.5-40 mesh) | 88.0 |
| Wood flour (45-140 mesh) | 11.0 |
| Para chlor-meta-cresol | 1.0 |
| | 100.0 |

This litter which was prepared as in Examples 1 and 2 also showed excellent utility as an improved poultry litter and retained its germicidal and fungicidal properties for an extended period.

Example 4

| | Per cent by weight |
|---|---|
| Ottawa (quartz) sand (rounded particles 2.5-40 mesh) | 88.2 |
| Para chlor-meta-xylenol | 0.4 |
| Ortho phenyl phenol | 0.4 |
| Infusorial earth (particle size 45-140 mesh) | 11.0 |
| | 100.0 |

This litter composition was also prepared according to the procedure of Example 1 and proved to be an excellent litter as demonstrated in actual use when the prevention of the growth of mold and destruction of parasites continued for more than a month in the poultry house.

Example 5

| | Per cent by weight |
|---|---|
| Asbestos sand (particle size 45-140 mesh) | 10.0 |
| Petrolatum | 5.5 |
| Para chlor-meta-cresol | 0.5 |
| Silica sand (rounded particles 2.5-40 mesh) | 64.0 |
| Gypsum sand (rounded particles 2.5-40 mesh) | 20.0 |
| | 100.0 |

The asbestos sand used in this example is known commercially as fibrous shorts. The first and second portions were prepared separately by thorough mixing and then combined by further mixing until a uniform distribution of the particles was obtained. This composition likewise performed satisfactorily as a poultry litter and maintained its disinfectant properties for an extended period.

Example 6

| | Per cent by weight |
|---|---|
| Washed sea sand (2.5-40 mesh) | 84.90 |
| #657 Malachite Green dye | .08 |
| Wood flour (45-140 mesh) | 13.00 |
| #657 Malachite Green dye | .02 |
| Oil of pine tar | 1.60 |
| Para chlor-meta-cresol | .40 |
| | 100.00 |

The washed sea sand and wood flour components of this example were dyed with #657 Malachite Green dye (non-poisonous) to permit food grains, shell, etc., which may be scattered over the litter to be more easily distinguished by the poultry. The dye was added as a 3% solution in ethyl alcohol and thoroughly mixed with the sea sand and wood flour until these components are uniformly tinted. The oil of pine tar is employed as a solvent for the para chlor-meta-cresol and is combined therewith by mixing at moderate heat not exceeding about 75° C. The three portions are finally mixed together until uniformly distributed by first combining the second and third portions and then incorporating the first portion. The use of the dye to provide contrast between the litter particles and the food particles, etc., scattered over the surface is optional and, as indicated in the other examples, may be dispensed with. However, its use has the advantage previously suggested as an aid in distinguishing the litter particles from grain and other food particles.

The compositions of the present invention include as a major ingredient a mineral component of rounded particles as free of flat surfaces and sharp edges as possible, thus providing a "mobility" characteristic which absorbs or cushions shock when a fowl lands after flying from a perch but also does not support much pressure so that when a fowl walks over an area covered with the new litter the fowl sinks into the surface thus promoting a desire to scratch. A slowly volatile disinfectant is also employed for fungicidal and germicidal purposes and is associated with a finely divided base such as infusorial earth or wood flour or other mineral organic material, but it is important and essential that the poultry cannot pick it up, thus causing internal injury. The disinfectant is slowly and constantly liberated by volatilization and thus the new litter promotes an atmosphere that is dust-free, sanitary and sterile.

While disinfectants such as calcium and sodium hypochlorite, peroxides, pine oil, creosote, para formaldehyde and the like may be used in the new compositions, they are either volatilized too rapidly and, therefore, are effective for only very short periods or are actually injurious to the poultry. I, therefore, prefer to use as disinfectants for the present purpose monohydric or dihydric phenols and homologs and substitution products thereof of the general formula $C_6H_x(OH)_yR$ where R is Cl or $C_6H_5$. Compounds of this type include ortho phenyl phenol, ortho chloro phenol, para chloro phenol, para chlor meta cresol, para chlor meta xylenol and similar chlorinated compounds of resorcinol. Trihydric phenols are not ordinarily useful because of their lower volatility and lower disinfecting properties.

In general, the disinfectant may be used in an amount between 0.1% and 5.0% by weight of the total litter composition depending upon the volatility and disinfectant potency of the material. A proportion of about 0.2% to 2.5% is preferred.

The mineral non-organic component of the new litter as indicated above consists of rounded particles substantially free of flat and sharp edged particles such as is illustrated in the examples. These particles should have an average particle size of about 2.5 to 40 mesh. The composition gives satisfactory results when this component comprises from about 60% to 90% by weight of the litter although for best results the rounded mineral particles should be present to the extent of between about 75% and 90% by weight of the total composition.

The fine particle size inert component likewise performs an important function as a carrier for the disinfectant. This material which may be either of the mineral type such as infusorial earth or of the organic type such as wood flour should have an average particle size of between about 45 and 140 mesh to prevent its being picked up by poultry and may be present in the litter in an amount between about 40% and 10% by weight preferably between about 25% and 10% by weight of the total litter.

The improved litter is generally useful in poultry raising and finds particular utility where the poultry is raised in confinement.

The litter of the present invention is characterized by numerous and important advantages. The high mineral particle content promotes evaporation of moisture and thus aids in maintaining dry, sanitary living conditions so essential to general health of poultry. The rounded nature of the mineral particles absorbs or cushions shock when the fowl alight after flying from a perch and also causes a slight sinking in of the birds when walking over the litter creating the desired scratching activity that discourages cannibalism tendencies. The association of the volatile disinfectant with a finely divided mineral or organic insulating base prevents injury to the fowl through eating the disinfectant since the particle size is so small that the birds cannot pick it up. The mineral component of large size which is present in major amount also encases excrement, thus contributing to sanitation of the poultry house. The disinfectant slowly volatilizes, thus slowly and constantly liberating the disinfectant creating an atmosphere that is dust-free, clean and sterile, greatly improving the general health of the poultry and reducing mortality rate by substantially eliminating poultry diseases commonly encountered.

It is apparent that many widely different embodiments of the invention may be made without departing from the spirit and scope thereof; and, therefore, it is not intended to be limited except as indicated in the appended claims.

I claim:

1. A poultry litter comprising rounded mineral aggregates in major proportion and a minor proportion of a finely divided inert material associated with a volatile disinfectant, said inert material being of such fineness that it is not readily picked up by poultry.

2. A poultry litter comprising rounded mineral aggregates in major proportion and a minor proportion of a finely divided inert material carrying a slowly volatile disinfectant selected from the class consisting of monohydric and dihydric phenols and homologs and substitution products thereof of the general formula $C_6H_x(OH)_yR$ where R is Cl or $C_6H_5$, said inert material being of such fineness that it is not readily picked up by poultry.

3. Litter of claim 2 in which the rounded mineral aggregates have a particle size of about 2.5 to 40 mesh.

4. Litter of claim 2 in which the finely divided inert material has a particle size of about 45 to 140 mesh.

5. Litter of claim 2 in which the rounded mineral aggregates are present in the proportion of about 3 to 9 parts by weight to 1 part by weight of the finely divided inert material.

6. Litter of claim 2 in which the disinfectant is present in amount of between 0.1% and 5.0% by weight of the total composition.

7. Litter of claim 2 in which the disinfectant is ortho phenyl phenol.

8. Litter of claim 2 in which the disinfectant is a chlorinated monohydric phenol.

9. Litter of claim 2 in which the disinfectant is a chlorinated dihydric phenol.

10. A poultry litter comprising rounded mineral aggregates of about 2.5 to 40 mesh and an inert material of about 45–140 mesh in the proportion of about 3 to 9 parts by weight of mineral aggregates to 1 part by weight of inert material, said inert material carrying about 0.2% to 2.5% by weight of a disinfectant selected from the class consisting of monohydric and dihydric phenols and homologs and substitution products thereof of the general formula $C_6H_x(OH)_yR$ where R is Cl or $C_6H_5$.

11. Litter of claim 10 in which the rounded mineral aggregates are sea sand.

12. Litter of claim 10 in which the finely divided inert material is infusorial earth.

13. Litter of claim 10 in which the finely divided inert material is wood flour.

14. A poultry litter consisting of approximately the following composition:

| | Per cent by weight |
|---|---|
| Washed sea sand (2.5-40 mesh) | 84.90 |
| #657 Malachite Green dye | .08 |
| Wood flour (45-140 mesh) | 13.00 |
| #657 Malachite Green dye | .02 |
| Oil of pine tar | 1.60 |
| Para chlor-meta-cresol | .40 |
| | 100.00 |

15. A poultry litter comprising rounded mineral aggregates in major proportion and a minor proportion of a finely divided inert material carrying a slowly volatile disinfectant consisting of para chlor meta cresol.

16. A poultry litter comprising rounded mineral aggregates in major proportion and a minor proportion of a finely divided inert material carrying a slowly volatile disinfectant consisting of para chlor meta xylenol.

LUELLA P. DREYLING.